US009767296B2

(12) United States Patent
Faitelson et al.

(10) Patent No.: US 9,767,296 B2
(45) Date of Patent: *Sep. 19, 2017

(54) REQUESTING ACCESS TO RESTRICTED OBJECTS BY A REMOTE COMPUTER

(71) Applicant: VARONIS SYSTEMS, INC., New York, NY (US)

(72) Inventors: Yakov Faitelson, Elkana (IL); Ohad Korkus, Herzeliya (IL); David Bass, Karmei Yosef (IL)

(73) Assignee: VARONIS SYSTEMS, INC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/160,603

(22) Filed: Jan. 22, 2014

(65) Prior Publication Data

US 2014/0137269 A1 May 15, 2014

Related U.S. Application Data

(63) Continuation-in-part of application No. 13/437,004, filed on Apr. 2, 2012.

(51) Int. Cl.
*G06F 7/04* (2006.01)
*G06F 21/60* (2013.01)
*G06F 17/30* (2006.01)

(52) U.S. Cl.
CPC .................................. *G06F 21/604* (2013.01)

(58) Field of Classification Search
CPC ........ G06F 21/604; G06F 21/62; G06F 21/64; G06F 2221/2101; G06F 2221/2151; G06F 21/6218; G06F 21/6245; G06F 17/30321; G06F 17/30528; G06F 17/3053; G06F 17/30554; G06F 17/30867; G06F 2221/2141; G06F 2221/2145; H04L 63/101; H04L 63/102; H04L 65/403
USPC ............ 726/26; 707/608; 713/178; 715/741, 715/752, 772
See application file for complete search history.

(56) References Cited

U.S. PATENT DOCUMENTS

| | | | | |
|---|---|---|---|---|
| 7,308,498 B1* | 12/2007 | Olsen | ................. | H04L 67/2814 455/41.2 |
| 8,190,754 B2* | 5/2012 | Strickland | ......... | G06F 17/30867 709/206 |
| 8,938,669 B1* | 1/2015 | Cohen | .................... | G06F 17/24 709/204 |
| 2003/0037119 A1* | 2/2003 | Austin | .................... | H04L 29/06 709/217 |
| 2004/0068524 A1* | 4/2004 | Aboulhosn | ....... | G06F 17/30206 |
| 2004/0172396 A1* | 9/2004 | Vanska | ............. | G07C 9/00309 |

(Continued)

FOREIGN PATENT DOCUMENTS

CN 102265579 11/2011

*Primary Examiner* — Gary Gracia
(74) *Attorney, Agent, or Firm* — Soroker Agmaon Nordman (57) ABSTRACT

A method for requesting access rights for an object of a computerized system, comprising invoking in a remote computer linkable to the computerized system an add-on program configured for notifying an owner of the object of the computerized system according to received contact data of the owner of the object, thereby requesting from the owner of the object access rights to the object independently of the computerized system, and an apparatus for performing the same.

17 Claims, 6 Drawing Sheets

(56) References Cited

U.S. PATENT DOCUMENTS

| | | | |
|---|---|---|---|
| 2005/0138104 A1* | 6/2005 | Houh | G06F 11/3684 709/200 |
| 2005/0192822 A1* | 9/2005 | Hartenstein | G06Q 10/109 705/319 |
| 2005/0232423 A1* | 10/2005 | Horvitz | G06Q 10/10 380/255 |
| 2005/0251500 A1* | 11/2005 | Vahalia | G06F 17/30171 |
| 2006/0064394 A1* | 3/2006 | Dettinger | G06F 17/30876 |
| 2006/0080278 A1* | 4/2006 | Neiditsch | G06Q 10/107 |
| 2006/0206464 A1* | 9/2006 | Marukawa | G06F 17/218 |
| 2006/0224735 A1* | 10/2006 | Hill | H04L 12/58 709/225 |
| 2006/0259585 A1* | 11/2006 | Keohane | G06F 17/30899 709/219 |
| 2007/0130166 A1* | 6/2007 | Takahashi | G06F 17/30011 |
| 2007/0199025 A1* | 8/2007 | Angiolillo | H04N 21/4113 725/47 |
| 2007/0214144 A1* | 9/2007 | Lawson | G06F 21/6218 |
| 2007/0244899 A1* | 10/2007 | Faitelson | G06F 21/604 |
| 2007/0282802 A1* | 12/2007 | Wilhelm | G06F 17/30884 |
| 2008/0034437 A1* | 2/2008 | Patterson | G06F 21/10 726/26 |
| 2008/0040653 A1* | 2/2008 | Levine | G06F 17/3089 715/205 |
| 2008/0109912 A1* | 5/2008 | Rivera | H04L 63/20 726/30 |
| 2008/0126232 A1* | 5/2008 | Lee | G06Q 40/00 705/35 |
| 2008/0148310 A1* | 6/2008 | Strickland | G06F 17/30867 725/30 |
| 2008/0201450 A1* | 8/2008 | Bong | G06F 9/468 709/219 |
| 2008/0235760 A1* | 9/2008 | Broussard | H04L 63/102 726/1 |
| 2008/0256458 A1* | 10/2008 | Aldred | G06F 21/6218 715/741 |
| 2008/0294641 A1* | 11/2008 | Kim | G06Q 10/10 |
| 2009/0150169 A1* | 6/2009 | Kirkwood | G06Q 10/00 705/342 |
| 2009/0157772 A1* | 6/2009 | Picon | G06F 17/30067 |
| 2009/0164271 A1* | 6/2009 | Johnson | G06Q 20/123 705/344 |
| 2009/0228716 A1* | 9/2009 | Poston | G06F 21/6209 713/189 |
| 2009/0228919 A1* | 9/2009 | Zott | H04N 7/17318 725/34 |
| 2009/0282062 A1* | 11/2009 | Husic | G06F 21/62 |
| 2009/0293105 A1* | 11/2009 | Urakawa | G06F 21/62 726/4 |
| 2009/0307775 A1* | 12/2009 | Brown | G06F 21/552 726/23 |
| 2010/0010998 A1* | 1/2010 | Wagner | G06F 21/6209 707/E17.01 |
| 2010/0011448 A1* | 1/2010 | Wagner | G06F 21/62 726/27 |
| 2010/0024011 A1* | 1/2010 | Fukuoka | G06F 17/30011 726/5 |
| 2010/0106765 A1* | 4/2010 | Saito | G06Q 10/107 709/202 |
| 2010/0153483 A1* | 6/2010 | Offermann | G06F 9/4443 709/203 |
| 2010/0161993 A1* | 6/2010 | Mayer | G06F 21/64 713/178 |
| 2010/0262624 A1* | 10/2010 | Pullikottil | G06F 17/30336 707/783 |
| 2011/0010134 A1* | 1/2011 | Balla | G06F 17/5004 703/1 |
| 2011/0040980 A1* | 2/2011 | Kerr | G06F 21/6245 713/189 |
| 2011/0055207 A1* | 3/2011 | Schorzman | G06F 17/30699 707/723 |
| 2011/0061111 A1* | 3/2011 | Faitelson | G06F 21/604 726/28 |
| 2011/0072520 A1* | 3/2011 | Bhansali | G06F 21/572 726/27 |
| 2011/0134471 A1* | 6/2011 | Kimura | G06F 3/1203 358/1.15 |
| 2011/0161091 A1* | 6/2011 | Freishtat et al. | 705/1.1 |
| 2011/0162040 A1* | 6/2011 | Stephens | G06F 21/6209 726/1 |
| 2011/0184989 A1* | 7/2011 | Faitelson | G06F 21/6218 707/784 |
| 2011/0247081 A1* | 10/2011 | Shelton | G06F 21/6218 726/28 |
| 2011/0252375 A1* | 10/2011 | Chaudhri | G06F 3/04817 715/835 |
| 2011/0282788 A1* | 11/2011 | Allison, Jr. | G06Q 20/0457 705/44 |
| 2011/0302210 A1* | 12/2011 | Comanescu | G06Q 50/18 707/784 |
| 2011/0307695 A1* | 12/2011 | Slater | G06F 17/30528 713/163 |
| 2012/0131686 A1* | 5/2012 | Risan | G06F 21/10 726/32 |
| 2012/0150989 A1* | 6/2012 | Portnoy | G06F 17/30876 709/217 |
| 2012/0173981 A1* | 7/2012 | Day | G06F 3/04817 715/719 |
| 2012/0179541 A1* | 7/2012 | Pasila | G06Q 30/02 705/14.49 |
| 2012/0221561 A1* | 8/2012 | Brown | G06Q 10/00 707/725 |
| 2012/0278386 A1* | 11/2012 | Losacco | H04L 67/1078 709/204 |
| 2012/0304306 A1* | 11/2012 | Chamarty | G06F 21/6209 726/28 |
| 2012/0331481 A1* | 12/2012 | Faludi | G06F 9/542 719/313 |
| 2013/0212650 A1* | 8/2013 | Dabbiere | H04L 63/10 726/4 |
| 2013/0226970 A1* | 8/2013 | Weber | G06F 21/6218 707/785 |
| 2013/0239014 A1* | 9/2013 | Patil | G06F 3/0482 715/748 |
| 2013/0246901 A1* | 9/2013 | Massand | G06F 17/24 715/229 |
| 2013/0263275 A1* | 10/2013 | Faitelson | G06F 21/604 726/26 |
| 2014/0244829 A1* | 8/2014 | Ortega-Binderberger | H04L 43/0805 709/224 |

* cited by examiner

REQUESTING ACCESS TO RESTRICTED OBJECTS BY A REMOTE COMPUTER

RELATED APPLICATIONS

The present application is a Continuation-in-Part of U.S. application Ser. No. 13/437,004 filed on Apr. 2, 2012, and published as US 2013/0263275 on Oct. 3, 2013, the disclosure of which is hereby incorporated by reference.

Reference is made to U.S. application Ser. No. 11/786,522, having an at least one common inventor with the present application, filed Apr. 12, 2007 and which is published as US2007/0244899, that reports methods and systems for decentralizing user data access rights control activities in networked organizations.

BACKGROUND

The present disclosure generally relates to requesting access rights to files, and more specifically to requesting access rights to files in an organization enterprise.

Generally, in an organization enterprise some users have access right for which other users do no have, yet, there might be occasions when a user wishes to access a file for which the user does not have access rights.

SUMMARY

One exemplary embodiment of the disclosed subject matter is a method for requesting access rights for an object of a computerized system, comprising invoking in a remote computer linkable to the computerized system an add-on program configured for notifying an owner of the object of the computerized system according to received contact data of the owner of the object, thereby requesting from the owner of the object access rights to the object independently of the computerized system.

Another exemplary embodiment of the disclosed subject matter is an apparatus for requesting access rights for an object, comprising a computerized system having a storage and storing at least one object and contact data of an owner of the at least one object, and further comprising a first communication facility by which data related to the at least one object is providable to devices external to the computerized system, and an at least one computer comprising a second communication facility for linking with the computerized system, and further having an add-on program installed therein that is configured for notifying, independently of the computerized system, the owner of the at least one object with a request for access rights for the at least one object based on the contact data of the owner of the at least one object as provided by the computerized system.

In the context of the present disclosure, without limiting, the term 'enterprise' implies a computerized system comprising a plurality of computers communicating therebetween and having and/or sharing a data storage, where the enterprise is also referred to as a 'computerized system' and the data storage also referred to as a 'storage'.

The communications between the computes may be direct and/or indirect. The data storage comprises one or more data storage devices.

Generally, without limiting, an enterprise comprises several computers in a range between about 10 computers and about 1000 computers or more. Optionally, an enterprise comprises less than 10 computers, not precluding having one computer as, for example, a mainframe computer.

Without limiting, in the context of the present disclosure with respect to an enterprise, the term 'object' implies a data object, such as a file or a folder, stored on the storage of the enterprise and also referred to as an object of the enterprise.

In the context of the present disclosure, without limiting, the term 'user' or 'operator' implies a person, and/or a program operating on behalf of the person, that uses a resource of an enterprise, such as a computer of the enterprise or a remote computer linkable and/or linked by communication to the enterprise such as by a computer thereof. The linkable and/or linked computer is generally referred to as a 'client computer' or a 'remote computer. A user or operator is also referred to as user of the enterprise or operator of the enterprise, respectively.

In the context of the present disclosure, without limiting, the term 'access right' or 'rights' or 'sufficient rights' imply authorization for a user to access an object of an enterprise, whereas insufficient rights imply not having an authorization to access the object such as for opening or reaching the object for viewing. Referring generally or collectively to permissions implies any kind of authorization including, possibly, sufficient and/or insufficient rights.

Generally and without limiting, the authorization or permissions, and/or other properties of objects such as classifications, are set by the management or administration of the enterprise and/or by owners of objects of the enterprise and/or by operators with special high level authorization, also known as super-users or administrators.

In the context of the present disclosure, without limiting, the term 'owner' of an object implies a user that has authority and/or access rights to an object so that he or she may grant or authorize access to the object to users not having sufficient rights for the object. Without limiting, a person and/or a program and/or any entity operative or operating on behalf on an owner of an object and authorized to grant rights to the object is also considered or regarded as the owner. The access may be granted on an ad-hoc basis or any other basis such as time-limited, user dependent of permanently.

In the context of the present disclosure, without, limiting, the terms 'conveniently' or 'handily' imply, with respect to an operation, at least partly automating an operation thereby precluding and/or eliminating specific manual actions.

The terms cited above denote also inflections and conjugates thereof.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

DETAILED DESCRIPTION

One technical problem dealt by the disclosed subject matter is handily requesting access rights to an object of an enterprise responsive to encountering the object for which a user does not have access rights, which for brevity is also referred to herein, without limiting, as a 'forbidden object' or a 'restricted object'.

One technical solution according to the disclosed subject matter is a computer operating a program configured to present, such as on a display device, a presentation structure adapted for requesting access rights to an object upon triggering or activation a forbidden object.

In some embodiments, the presentation structure or a component of a user-interface or a graphical-user-interface (GUI), such as a dialog-box, a form, or any other presentation structure such as a button. For brevity and clarity, without limiting and unless otherwise specified, the presentations structure is also referred to a 'dialog' or a 'pop-up dialog'.

In some embodiments, the dialog is formed such that the user can accept the dialog, for example, by clicking on an 'OK' button in the dialog, or by any other way such as double-click on the dialog.

Responsive to accepting the dialog, the owner of the object is notified such a by sending an email to the owner, and, consequently, the owner may grant access rights for the objects to the user.

A potential technical effect of the disclosed subject matter is a convenient handy method for automatically requesting access rights for a forbidden object in an enterprise responsive to browsing objects of the enterprise.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

According to the disclosed subject matter, in order to request access rights for a forbidden object by a user, the user does not have to identify the forbidden object and consequently locate the owner of the forbidden object. Rather, one or more programs and/or software modules, also referred to as a 'code', are configured to retrieve contact data of the owner of the forbidden object, such as email address of telephone number, and automatically send a request for accessing the forbidden object to the owner of the forbidden object. It is noted that in some embodiments, the code and/or functionality thereof is modified for enabling a client computer to handle requesting of permissions as described below. It is also noted that contact data or contact details of an owner of an object may comprise one item such as an email address or a telephone number, or also a plurality of such items.

In some embodiments, a program and/or application and/or a file-system of the enterprise is adapted by the code which associates objects with contact data of an owner thereof and further, optionally, with one or more other information such as identification of the object. For example, objects of the enterprise are related to owners thereof and their respective contact information such as by one or more data structures as part of the administrative data maintained in the enterprise, such as an index or a database, collectively referred to also as an index. Accordingly, the association or relationship of a forbidden object with contact information of the owner is based on querying or retrieving elements of the index.

Thus, in some embodiments, when the user operates a client computer to locate objects and/or to access objects of the enterprise, such as files, the enterprise provides to the client computer references or denotations of objects which can be used to refer to the objects and/or access the objects, at least in principle. For example, links to the objects, unique names or identifications of the objects, or any other technique for identifying and accessing the objects such as addresses of the objects, not precluding objects or parts thereof. Generally, the objects may be located in the enterprise or parts thereof by searching for objects, browsing in the enterprise or by any method of the art, for example, by exploring a directory of the enterprise.

Consequently, the client computer lists presentations of the objects such as by symbols or icons, or titles or names of the objects, or a part of the content of the objects, collectively referred to as presentations or representations of the objects.

For brevity and clarity, without limiting, referring to a presented object or a presentation thereof implies also a link to the object, such as by a symbol that embeds a link to the object.

An object is activated for access by triggering or activation a representation of the objects. For example, by pointing at the presented object and double-clicking, or touching a finger on a touch-screen, or clicking with a dedicated mouse button, for example, a right button, or using a combination of keyboard key and a mouse button such as 'alt/left-button', or by any suitable action such a distinct hand motion in screens having a sensor or camera such as in smartphones. Optionally, activation of an object involves two or more stages, for example, responsive to triggering a representation of an object a dialog is presented to the user, for example, as a pop-up dialog, for effecting and/or accepting the activation such as by an 'Enter' key. In some embodiments, however, activation of the object is performed automatically without having to accept a dialog.

In some embodiments, data or metadata of the object is presented, such as such as the full path of the object, or permissions thereof or the owner of the object, either along with the presentations of the objects or pursuant to activation of representations of the objects.

In case the object is accessible to the user, such as by suitable permission, the object in the enterprise may be accessed. Otherwise, in case the object is not accessible to the user, such as by lack of permission, using the code installed in the enterprise the owner is automatically informed or notified that the user requests access rights to the object, without the user having to perform the chores of locating the owner and identifying the object and requesting the access rights to the object.

In some embodiments, the owner of the object is notified, such as by sending an email to the owner or by any other method such as SMS, Instant Messaging, or a telephone call. In some embodiments, the owner grants the user access rights to the forbidden object by email or any other method such as SMS, Instant Messaging or by releasing the forbidden object via the enterprise facilities for access by the user, optionally for a certain time period and, optionally, notifying the user to that effect.

In some embodiments, instead of the enterprise taking care of notifying the owner, the duty or task of notifying the owner is delegated to or based in the client computer, thereby relieving the enterprise which generally is occupied with multitude of tasks, from additional or non-essential and/or excessive load.

In some embodiments, the code and/or operation thereof in the enterprise is modified such as to provide to the client computer only the owner contact details and to load or transfer to the client computer an add-on program configured to enable the client computer to request permission from an owner of a forbidden object. Generally, at least potentially, transferring contact details of an object and an add-on code to the client computer poses or constitutes a smaller load on the enterprise relative to having to handle requests for permissions. Moreover, once the enterprise transferred the add-on program to a client computer an indication for that effect may be generated, so that no further download of the add-on program to that client computer is required.

Thus, in some embodiments, as the user obtains a presentation or a link to a forbidden object, the code of the enterprise merely transfers the contact details of the owner of the object to the client computer and, optionally, if still required, downloads the add-on program to the client computer. In some embodiments, the code of the enterprise transfers the contact details of the owner of the object to the client computer and, optionally, if still required, the add-on program only responsive to activation of a forbidden object, thereby further reducing the load on the enterprise in case the object was not activated. Alternatively, in some embodiments, the client computer requests the enterprise for the contact details of the owner of the object and the enterprise, as part of the activities thereof, provides the contact details to the client computer along with add-on program if still required. Further, optionally or additionally, the code of the enterprise transfers the add-on program to the client computer, if still required, when the client computer links with the enterprise as, for example, sensed by the code of the enterprise and/or any other component thereof. Further optionally, in some embodiments, the client computer obtains and installs the add-on program by other circumstances, for example, by a provided storage medium such as a USB device or by communication with a supplier on behalf of the enterprise, thus the client computer is not necessarily linked to the enterprise for obtaining the add-on program.

Consequently, when the user activates a forbidden object, the add-on program in the client computer is invoked and sends the request for permission to the owner of the object, such as described above.

In some embodiments, the code in the enterprise is tunable or adjustable such as to operate in different manners according to some circumstances and/or settings. For example, in case the enterprise decides or instructed not to provide contact details of an owner of an object, even anonymously, then the code sends the request to the owner even if the client computer comprises the add-on program. As another example, the code operating in the enterprise may be advised or sense that the enterprise is overloaded such as above a limit, and consequently the code delegates the task of notifying owners to the client computer as described above.

It is noted that the code and add-on program are designate as such for brevity and clarity, whereas in principle the code and add-on program may be of the same nature. For example, the code is installed on one or more computers or servers of the enterprise as an add-on code.

The code and/or the add-on program are installed or integrated for operation in the enterprise or the client computer, respectively, as known in the art such as by a mechanism of a plug-in or a script. For example, as a Flash (Adobe Inc) or a JavaScript (Oracle Inc.) or an ActiveX (Microsoft Inc.).

Figure 1A:
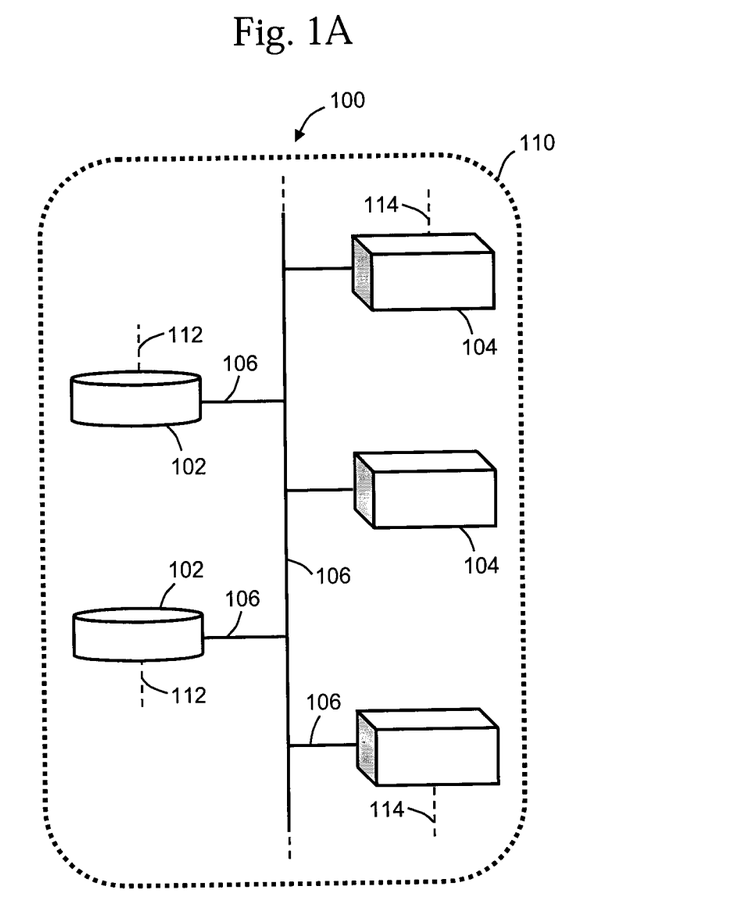
FIG. 1A schematically illustrates an enterprise comprising one or more computers, illustrated as three computers representing any number of computers, according to exemplary embodiments of the disclosed subject matter.

FIG. 1A schematically illustrates an enterprise 100, designated by a dotted frame 110, comprising one or more computers, illustrated as three instances of a computer 104, representing any number of computer 104, as indicated by dashed lines 114.

Enterprise 100 further comprises one or more data storage devices, illustrated as two instances of a data storage device 102, representing any number of data storage device 102, as indicated by dashed lines 112. Data storage device 102 generally stores objects or data entities such as files or database records or users definitions or similar elements collectively referred to also as objects. Data storage device 102 optionally stored an index or part thereof of enterprise 100.

Enterprise 100 is configured to provide or transfer to devices external to enterprise 100 by communications facilities comprised therein objects thereof and/or data related to objects thereof, such as references to objects, and/or other data related to objects thereof such as data obtained from an index of enterprise 100.

The instances of computer 104 are connected or linked or coupled therebetween and to the instances of data storage device 102, the connection or linkage illustrated and represented by a network 106.

Optionally, one or more of computer 104 stands for or operate as a server of enterprise 100.

Figure 1B:
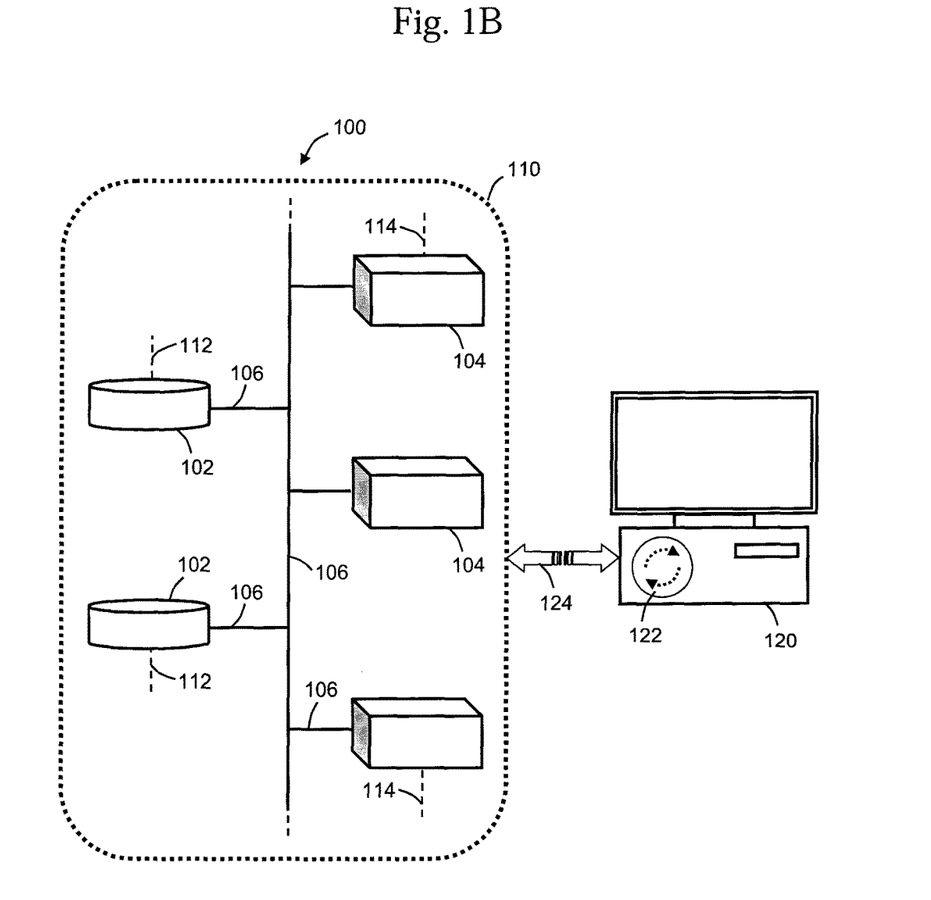
FIG. 1B schematically illustrates the enterprise of FIG. 1A with a remote computer linked to the enterprise, according to exemplary embodiments of the disclosed subject matter.

FIG. 1B schematically illustrates enterprise 100 with a client computer 120 linked to enterprise 100, representing any number of client computer 120.

Client computer 120 is connected or linked to enterprise 100 by any communication facility or facilities comprised in enterprise 100 and/or client computer 120 as illustrated schematically by a double-ended arrow 124 representing also a two-directional data flow between enterprise 100 and client computer 120. For example, client computer 120 is linkable with enterprise 100 via network 106 and/or one of computer 104, Client computer 120 comprises an add-on program, schematically illustrated as a program 122, configured for and operative for requesting permission from an owner of a forbidden object, such as described above, for example, by a transfer from enterprise 100 initiated by enterprise 100 and/or client computer 120.

Figure 2:
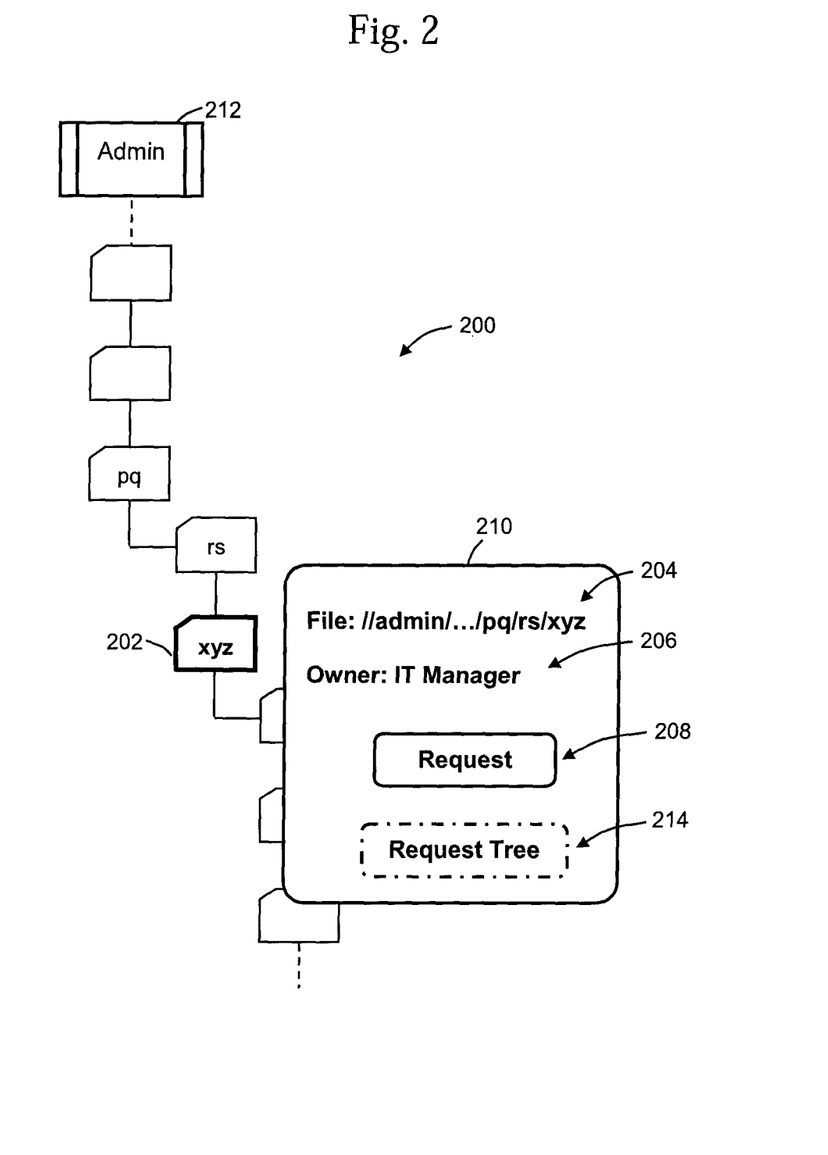
FIG. 2 schematically illustrates a display of a tree structure of objects in an enterprise accompanied by a pop-up dialog for rights request, according to exemplary embodiments of the disclosed subject matter.

FIG. 2 schematically illustrates a display or representations of a tree structure 200 of objects in an enterprise, such as enterprise 100, accompanied by a pop-up dialog 210 for rights request, according to exemplary embodiments of the disclosed subject matter. The dashed lines in tree structure 200 indicate some, if any, continuation of the tree structure.

Generally, the display is presented on a screen of a remote computer such as, for example, client computer 120, usually though not necessarily responsive to a search in the enterprise launched by the remote computer.

In some embodiments and/or cases, a user browsing the enterprise or searching therein, such as in a server 212 denoted as 'Admin', may encounter a forbidden object 202, denoted as a file or folder 'xyz'.

By way of example, it is assumed that the user wishes to access forbidden object 202 for which the user does not have access rights. Thus, the user has to request access rights from the owner of forbidden object 202, not necessarily knowing who the owner is and/or how to contact the owner.

The user may activate or trigger forbidden object 202, such as by pointing with a mouse on forbidden object 202 and pressing right-button, and a pop-up dialog 210 is presented.

Pop-up dialog 210 comprises object identification 204 of forbidden object 202, and, optionally, also name 206 of the owner of forbidden object 202.

Having confirmed by object identification 204 that indeed access rights are wanted for forbidden object 202, the user may accept the request by activating a button 208, denoted as 'Accept', such as by double-click on button 208 and/or pressing 'Enter' key. Having accepted the request, pop-up dialog 210 disappears.

Responsive to acceptance, the owner, such as 'IT Manager', receives a notification that the user has requested access to forbidden object 202, and the owner may provide the access rights for forbidden object 202 to the user.

In some embodiments, providing and/or sending a notification to the owner is carried out by the enterprise such as enterprise 100 by employing a code installed therein.

Alternatively, in some embodiments, providing and/or sending a notification to the owner is carried out by an add-on program such as program 122 installed in client computer 120 based on contact data of the owner as provided by the enterprise.

In some embodiments, instead of and/or in addition to object identification 204 of forbidden object 202, the representation of forbidden object 202 is highlighted such as in a special color or a texture or a pattern.

In some embodiments, the user is not allowed to know who the owner is, and in such a case, name 206 is not included in pop-up dialog 210.

Thus, in some embodiments, pop-up dialog 210 comprises only button 208.

In some embodiments, when forbidden object 202 is a folder comprising multiple objects, access rights for the whole or a part of sub-tree of objects in of forbidden object 202 may be requested, where, accordingly, pop-up dialog 210 comprises a button 214 denoted as 'Accept Tree'.

In some embodiments, a multiplicity of forbidden objects may be selected, for example, by repeatedly clicking by a left-button of a mouse, and subsequently triggering the multiplicity of forbidden objects such as by a right-button of a mouse. Responsively, a dialog appear, optionally comprising the identifications of the multiplicity of forbidden objects and further, optionally, the respective owners of the multiplicity of forbidden objects. Accepting the dialog the respective owners of the multiplicity of forbidden objects are notified that access rights are requested for the multiplicity of forbidden objects, and the owners may respond by providing the requested rights.

In some embodiments, responsive to activation or triggering an object for which a user has access rights no dialog appears, optionally with some indication such as a 'beep'. Optionally or alternatively, a dialog appears notifying the user that he or she does not have access rights to the object.

In some embodiments, triggering or activation the object comprises, such as in addition or instead of the activation techniques described above, hovering on the object with a pointing device such as a mouse, without any further operation such as right-button click.

It is noted the when a touch screen is used, the pointing device includes a finger and/or other member of the user. It is further noted that, at least in some embodiments, a keyboarded and/or keys thereof is considered as a pointing device, for example, arrow keys to point at a representation of an object and a key such as an 'Enter' key are used to point at a representation of an object and to trigger the representation thereof.

It is noted that, in some embodiments, the owner of a forbidden object should provide an explanation and/or rationale why the owner grants access rights to a forbidden object or refuses to do so.

Provided that the owner granted permission to a forbidden object to a user, the user may use any suitable apparatus to access the now non-forbidden object, for example, any suitable client computer.

It is noted that an enterprise, such as enterprise 100, is provided as an example, and the methods described herein may be used for or applied to any computerized system, not precluding a single computer.

Figure 3A:
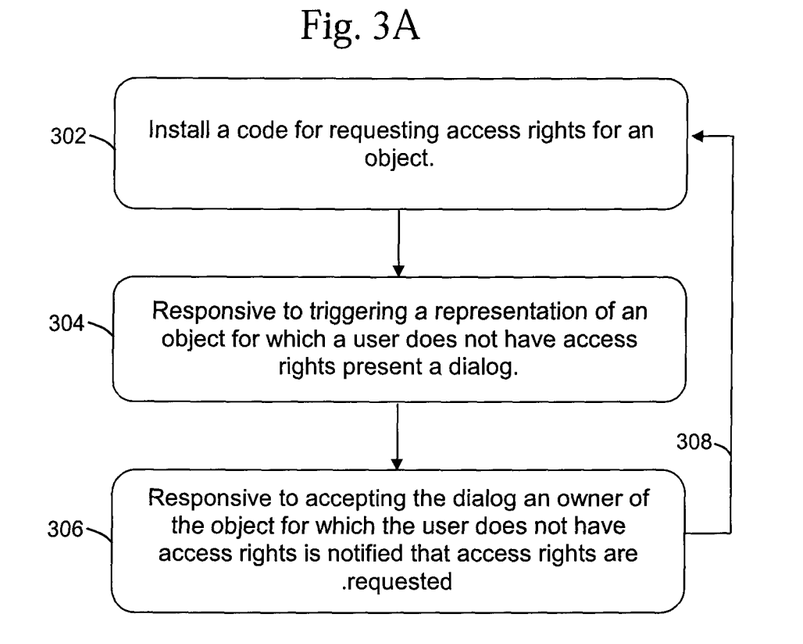
FIG. 3A outlines operations for requesting access rights for an object for which a user does not have access rights, according to exemplary embodiments of the disclosed subject matter.

FIG. 3A outlines operations for requesting access rights for an object for which a user does not have access right, according to exemplary embodiments of the disclosed subject matter.

In operation 302 a code that enables or facilitates requesting access rights for an object, as by operation 304 and operation 306 below, is installed.

The code is installed in an enterprise, such as enterprise 100, in one or more of the programs of the enterprise such as file system thereof or any other program that can display and/or browse the objects of the enterprise, such as a search program.

In some embodiments, the code is installed as a plug-in code or a script and/or otherwise additional code cooperating and/or integrated with the enterprise program and/or programs.

In operation 304 a dialog, such as a pop-up dialog, is presented responsive to triggering a representation of an object for which a user does not have access rights.

The triggering of the representation of the object may be carried out by pointing at the object such a by a mouse and applying a preset or a reserved operation such as right-button of a mouse.

In operation 306 responsive to accepting the dialog an owner of the object for which the user does not have access rights is automatically notified that access rights are requested.

In some embodiments, the code enables selecting a plurality of objects for which a user does not have access rights and accepting a dialog for the plurality of objects the owner or owners of the respective objects are notified that access rights are requested for the objects.

Once the code is installed, operation 304 and operation 306 may be repeated as indicated by an arrow 308.

Figure 3B:
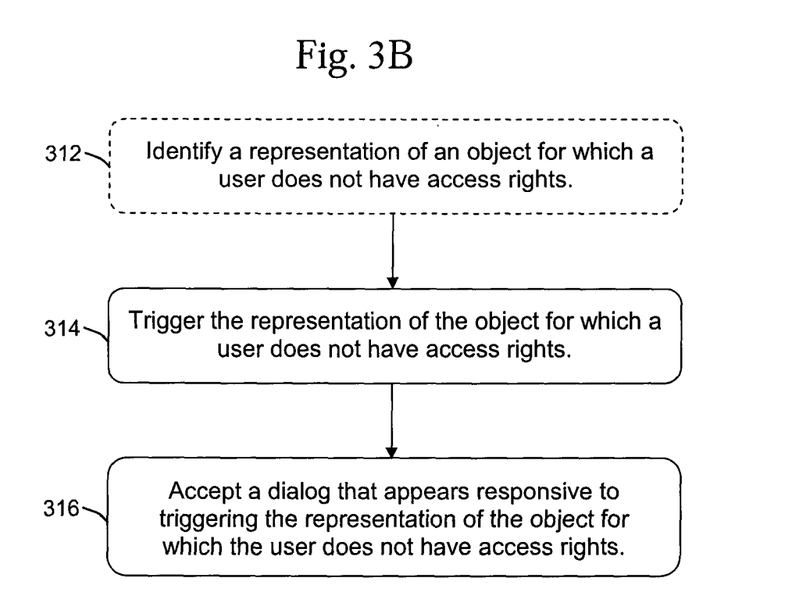
FIG. 3B outlines operations by a user requesting access rights for and object for which the user does not have access rights, according to exemplary embodiments of the disclosed subject matter.

FIG. 3B outlines operations by a user requesting access rights for an object for which the user does not have access rights, according to exemplary embodiments of the disclosed subject matter.

In operation 312 a user, optionally, identifies a representation of an object for which the user does not have access rights.

In operation 314 the user triggers the representation of the object for which a user does not have access rights. For example, pointing by a mouse the representation of the object and applying a preset or a reserved operation such as right-button of a mouse or hovering over the representation of the object.

In operation 316 the user accepts a dialog that appears responsive to triggering the representation of the object for which the user does not have access rights, thereby automatically notifying an owner of the object for which the user does not have access rights that access rights are requested by the user.

In some embodiments, the user may select a plurality of objects for which a user does not have access rights and in a similar manner request the owner or owners of the objects access rights thereto.

It is noted that by the methods and embodiments described herein a user may request access rights from an owner of an object wherein the user does not know who the owner is and, furthermore, optionally, the user is not allowed to know who the owner is and/or to know how to contact the owner.

It is noted that referring to a dialog and operations respective thereto is a non-limiting example for conveying a non-limiting practice of the present disclosure. Alternatively, in some embodiments, different dialog and operations thereof may be used. Optionally or alternatively, no dialog is used, for example, once a forbidden object or a presentation thereof is triggered or activated, the owner of the forbidden object is notified.

Figure 4A:
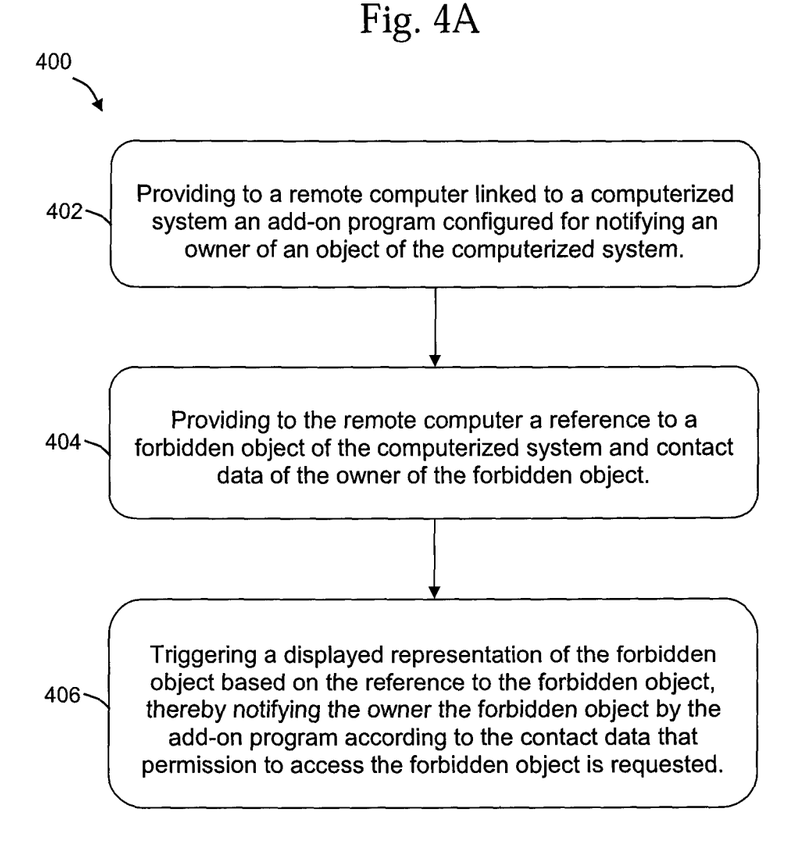
FIG. 4A outlines operations for requesting by a remote computer access rights for an object for which a user does not have access rights, according to exemplary embodiments of the disclosed subject matter.

FIG. 4A outlines operations 400 for requesting by a remote computer access rights for an object for which a user does not have access rights, according to exemplary embodiments of the disclosed subject matter.

In operation 402 an add-on program configured for notifying an owner of an object of a computerized system is provided to a remote computer linked to the computerized system, where the add-on program is a program installed and operable in the remote computer by a mechanism such as of a plug-in or a script.

The add-on program is provided to the remote computer by any method, for example, by a storage device or via communications with a provider of the add-on program.

In operation 404 a reference to a forbidden object of the computerized system and contact data of the owner of the forbidden object are provided to the remote computer.

Generally, a reference to an object such as the forbidden object is provided as a link to the object or as by any other manner to locate and/or access the object, such as an address of the object.

In operation 406 a representation of the forbidden object is displayed on and/or by the remote computer based on the reference to the forbidden object, and by triggering or activating the representation of the forbidden object the owner the forbidden object is notified by the add-on program according to the contact data that permission to access the forbidden object is requested for a user operating the remote computer.

Triggering or activating a representation of an object is carried out by an action on and/or directed to the representation, for example, double-clicking by a mouse, double-tapping on a touch screen or any other suitable technique where some of which are described above.

It is noted that, in some embodiments, operation 404 may precede operation 402.

Figure 4B:
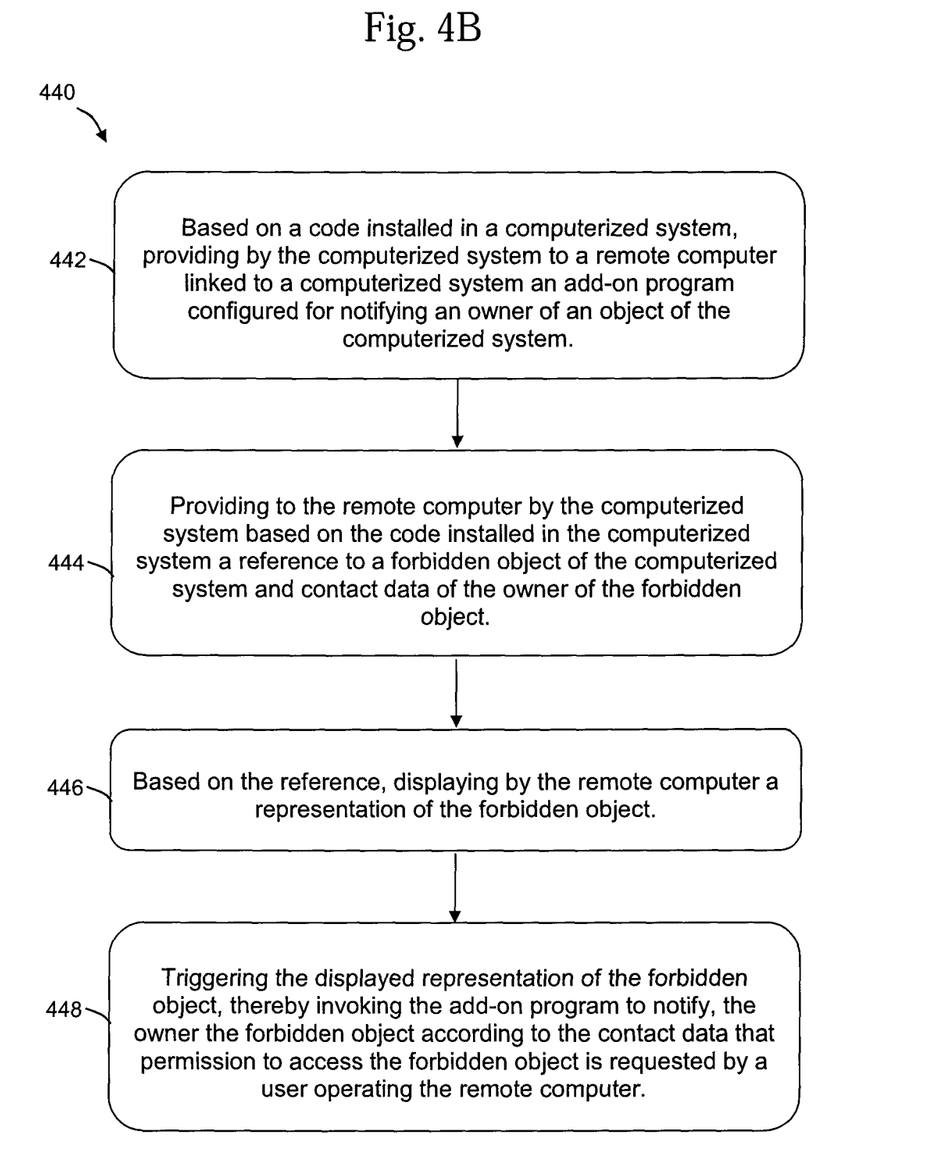
FIG. 4B outlines some elaboration on the operations of FIG. 4A, according to exemplary embodiments of the disclosed subject matter.

FIG. 4B outlines operations 440 as some elaboration on operations 400, according to exemplary embodiments of the disclosed subject matter.

In operation 442 an add-on program configured for notifying an owner of an object of a computerized system is provided by the computerized system to a remote computer linked to the computerized system by and/or based on a code installed in a computerized system.

The code refers to a program or software modules installed in the computerized system such as in one or more components thereof. For example, the code is installed by a mechanism such as a library, dynamic link library (DLL) or any suitable mechanism such as a plug-in or a script.

In operation 444 a reference to a forbidden object of the computerized system and contact data of the owner of the forbidden object is provided to the remote computer by the computerized system by and/or based on the code installed in the computerized system.

In some embodiments, the reference is provided to the computerized system based on the ordinary and/or original software of the computerized system, namely, not involving the code. Further, according to and/or based on the code, the contact data is provided to the computerized system.

In operation 446 a representation of the forbidden object is displayed by the remote computer according to and/or based on the reference, such as on a screen of and/or linked to the remote computer.

In operation 448 the displayed representation of the forbidden object is triggering or activated. Consequently, by utilizing the contact data the add-on program is invoked to notify the owner the forbidden object that permission to access the forbidden object is requested by a user operating the remote computer.

It is noted that, in some embodiments, operation 444 may precede operation 442.

In some embodiments, the computerized system requests the computerized system to provide the contact data pursuant to or responsively to receiving the reference, or, alternatively, in some embodiments, the computerized system requests the computerized system to provide the contact data pursuant to or responsively to triggering the reference.

In some cases and/or embodiments, responsive to receiving the notification the owner of the forbidden object may grant permission to the user of the remote computer to access the forbidden objects, optionally subject to one or more conditions such as expiration period of the permission, locality of the remote computer, limited number of accesses and so forth.

It is emphasized that at least some of the operations described above, such as operation 402, operation 404, operation 442 or operation 444, or all the operations described above are applicable to any object rather than to a forbidden object only.

It is also emphasized that in some cases a forbidden object may comprise at least one section forbidden to a user, so that a notification to the owner may be applicable only to the forbidden section.

It is emphasized that referring herein to a remote computer linked to a computerized system does not necessarily imply that the remote computer is indeed linked to the computerized system to carry out the operations described above. Rather, the remote computer may be intermittently linked the computerized system only for receiving and/or exchange data with the computerized system, and thus the remote computer is also referred to as being linkable to the computerized system. For example, client computer 120 is linkable to enterprise 100 rather than being constantly linked to enterprise 100.

It is further emphasized that, in some embodiments, notifying an owner of an object of a computerized system by the add-on program operable in a remote computer linkable and/or linked to the computerized system is carried out independently of the computerized system whether the remote computer is linked or unlinked or detached from the computerized system. For example, operation 406 of operations 400 or operation 448 of operations 440 may be carried out on client computer 120 independently of a computerized system such as enterprise 100.

It is noted that by notifying an owner of an object of a computerized system, a contact detail and/or details of a user operating the remote computer, such as client computer 120, are provided to the owner either implicitly or explicitly. For example, in case an email or SMS is used to notify the owner, the owner may obtain the contact of the user implicitly by the sender email or telephone number, respectively. As another example, the user may attach explicitly a contact, such as an email, of the user for the owner responds to the user.

There is thus provided according to the present disclosure a method for requesting access rights for an object of a computerized system, comprising invoking in a remote computer linkable to the computerized system an add-on program configured for notifying an owner of the object of the computerized system according to received contact data of the owner of the object, thereby requesting from the owner of the object access rights to the object independently of the computerized system.

In some embodiments, the contact data of the owner of the object is received from the computerized system when the remote is linked to the computerized system.

In some embodiments, the add-on program is received from the computerized system when the remote computer linkable to the computerized system is linked to the computerized system.

In some embodiments, wherein the add-on program is invoked responsive to triggering a displayed representation of the object which is based on a reference to the object received from the computerized system.

In some embodiments, a user of the computerized system does not have access rights for the object of the computerized system.

In some embodiments, a user of the computerized system does not have access rights for the object of the computerized system.

In some embodiments, the user is ignorant who the owner of the object is.

In some embodiments, the user is ignorant about contact information of the owner.

In some embodiments, the triggering of the displayed representation of the object comprises an operation with respect to the displayed representation of the object by a pointing device.

In some embodiments, notifying the owner comprises at least one of sending an email to the owner, sending SMS to the owner, instant messaging the owner, telephoning the owner, or any combination thereof.

In some embodiments, the add-on program is installed in the computer as at least one of a plug-in program, a script, a library, a dynamic-link-library, or any combination thereof.

There is thus yet provided according to the present disclosure an apparatus for requesting access rights for an object, comprising a computerized system having a storage and storing at least one object and contact data of an owner of the at least one object, and further comprising a first communication facility by which data related to the at least one object is providable to devices external to the computerized system, and an at least one computer comprising a second communication facility for linking with the computerized system, and further having an add-on program installed therein that is configured for notifying, independently of the computerized system, the owner of the at least one object with a request for access rights for the at least one object based on the contact data of the owner of the at least one object as provided by the computerized system.

In some embodiments, the at least one computer comprises a screen on which a representation of the at least one object is displayable based on a reference to the object receivable from the computerized system.

In some embodiments, the representation of the at least one object when displayed on the screen is triggerable to invoke the add-on program to notify the owner of the at least one object.

In some embodiments, triggering of the displayed representation of the at least one object comprises an operation with respect to the displayed representation of the at least one object by a pointing device.

In some embodiments, notifying the owner comprises at least one of sending an email to the owner, sending SMS to the owner, instant messaging the owner, telephoning the owner, or any combination thereof.

In some embodiments, the add-on program is installed in the computer as at least one of a plug-in program, a script, a library, a dynamic-link-library, or any combination thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable to controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a similar one denotes an apparatus having one or more processors operable or operating according to a program.

As used herein, without limiting, a module represents a part of a system such as a part program operating together with other parts on the same unit, or a program component operating on different unit, and a process represents a collection of operations for achieving a certain outcome.

The term "configuring" and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated operations may occur in deferent order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or 'adapting' for an objective, or a variation thereof, implies using materials and/or components in a manner designed for and/or implemented and/or operable or operative to achieve the objective.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for requesting access rights for a folder of a computerized system, comprising:
    installing in a remote computer, linkable by first communications facilities to the computerized system, an add-on program configured for requesting from an owner of the folder access rights to the folder for a user according to contact data of the owner received at the remote computer from the computerized system;
    displaying a representation of the folder on a display device of the remote computer when browsing folders of the computerized system for said folder by the remote computer according to information provided to the remote computer by the computerized system;
    as a result of an attempt to access the representation of the folder where the user does not have access right for the folder, the add-on program is executed at the remote computer, wherein the execution of the add-on program comprises automatically notifying the owner of a request for access rights to the folder without notifying the user of issuing the request or receiving confirmation from the user to issue the request;
    transparently of the user and independently of the computerized system, automatically requesting from the owner access rights to the folder for the user by causing the add-on program in the remote computer to send, according to the contact data of the owner, a request to the owner for access rights to the folder for the user;
    upon receiving indication of granted permission by the owner, enabling access to the folder for the user of the remote computer; and
    wherein when the folder comprises multiple objects, presenting a dialog to the user indicating that the user does not have access rights for the requested multiple objects, wherein the dialog comprises at least the multiple objects' identifications, and wherein the attempt to access the folder comprises receiving an input by double-tapping on the folder on a touchscreen to automatically request for the user access rights for the multiple objects by automatically notifying respective owners of multiple objects based on the contact data of the respective owners of each object.

2. The method according to claim 1, wherein the contact data of the owner of the folder is received from the computerized system when the remote computer is linked to the computerized system.

3. The method according to claim 1, wherein the add-on program is received from the computerized system when the remote computer linkable to the computerized system is linked to the computerized system.

4. The method according to claim 1, wherein the add-on program is invoked responsive to triggering a displayed representation of the folder which is based on a reference to the folder received from the computerized system.

5. The method according to claim 4, wherein the triggering of the displayed representation of the folder comprises an operation directed to the displayed representation of the folder by a pointing device.

6. The method according to claim 1, wherein the user is ignorant who the owner of the folder is.

7. The method according to claim 1, wherein the user is ignorant about contact information of the owner.

8. The method according to claim 1, wherein requesting the owner comprises at least one of sending an email to the owner, sending SMS to the owner, instant messaging the owner, telephoning the owner, or any combination thereof.

9. The method according to claim 1, wherein the add-on program is installed in the computer as at least one of a plug-in program, a script, a library, a dynamic-link-library, or any combination thereof.

10. The method of claim 1, wherein the permission is subject to a condition selected from the group consisting of: an expiration period, a locality of the remote computer, and a limited number of access times.

11. The method of claim 1, wherein the request to the owner comprises contact details of a user of the remote computer.

12. The method of claim 1, wherein the permission granting access to the folder comprises access rights for a whole or a part of a sub-tree of objects in the folder.

13. The method of claim 1, comprising receiving from the user a selection of a multiplicity of folders for request of permission via repetitive inputs received by one or more attempts to access, wherein said repetitive inputs cause the add-on program to display a dialog comprising identification of the multiplicity of the folders and respective owners of the multiplicity folders.

14. The method of claim 13, further comprising in response to receiving an input by one or more attempts to access to indicate acceptance of the dialog, notifying the respective owners of the multiplicity of folders that access rights are requested for the multiplicity of folders.

15. The method of claim 1, wherein receiving the indication of granted permission by the owner of the folder is via e-mail, SMS, instant messaging, releasing the folder via the computerized system, or a combination thereof.

16. The method of claim 1, wherein enabling access comprises opening the folder.

17. A method for requesting access rights for a folder of a computerized system, comprising:

installing in a remote computer, linkable by first communications facilities to the computerized system, an add-on program configured for requesting from an owner of the folder access rights to the folder for a user according to contact data of the owner received at the remote computer from the computerized system;

displaying a representation of the folder on a display device of the remote computer when browsing folders of the computerized system for said folder by the remote computer according to information provided to the remote computer by the computerized system;

as a result of an attempt to access the representation of the folder where the user does not have access right for the folder, the add-on program is executed at the remote computer, wherein the execution of the add-on program comprises automatically notifying the owner of a request for access rights to the folder without notifying the user of issuing the request or receiving confirmation from the user to issue the request;

transparently of the user and independently of the computerized system, automatically requesting from the owner access rights to the folder for the user by causing the add-on program in the remote computer to send, according to the contact data of the owner, a request to the owner for access rights to the folder for the user;

upon receiving indication of granted permission by the owner, enabling access to the folder for the user of the remote computer; and wherein when the folder comprises multiple objects, presenting a dialog to the user indicating that the user does not have access rights for the requested multiple objects, wherein the dialog comprises at least the multiple objects' identifications, and wherein the attempt to access the folder comprises receiving an input by hovering over the folder with a pointing device responsive to operations of a mouse to automatically request for the user access rights for the multiple objects by automatically notifying respective owners of multiple objects based on the contact data of the respective owners of each object.

\* \* \* \* \*